United States Patent
Doisaki et al.

(10) Patent No.: US 10,927,323 B2
(45) Date of Patent: Feb. 23, 2021

(54) COMPOSITION CONTAINING HIGHLY UNSATURATED FATTY ACID OR ALKYL ESTER THEREOF AND A METHOD FOR PRODUCING THE SAME

(71) Applicant: NIPPON SUISAN KAISHA, LTD., Tokyo (JP)

(72) Inventors: Nobushige Doisaki, Ibaraki (JP); Kiyomi Furihata, Tokyo (JP); Hideaki Yamaguchi, Tokyo (JP)

(73) Assignee: Nippon Suisan Kaisha, Ltd., Tokyo (JP)

( * ) Notice: Subject to any disclaimer, the term of this patent is extended or adjusted under 35 U.S.C. 154(b) by 0 days.

(21) Appl. No.: 16/881,352

(22) Filed: May 22, 2020

(65) Prior Publication Data

US 2020/0283698 A1    Sep. 10, 2020

Related U.S. Application Data

(63) Continuation of application No. 16/404,662, filed on May 6, 2019, now Pat. No. 10,696,924.

(30) Foreign Application Priority Data

Dec. 12, 2018 (JP) ................. 2018-232498

(51) Int. Cl.
| | | |
|---|---|---|
| C11C 3/10 | (2006.01) | |
| C11B 1/06 | (2006.01) | |
| C11B 3/12 | (2006.01) | |
| C11C 3/00 | (2006.01) | |
| B01D 3/12 | (2006.01) | |
| B01D 3/14 | (2006.01) | |

(52) U.S. Cl.
CPC ............... *C11C 3/10* (2013.01); *C11B 1/06* (2013.01); *C11B 3/12* (2013.01); *C11C 3/003* (2013.01); *B01D 3/12* (2013.01); *B01D 3/143* (2013.01)

(58) Field of Classification Search
CPC ..... C11B 1/06; C11B 3/12; C11C 3/10; C11C 3/003
USPC ........................................................ 554/169
See application file for complete search history.

(56) References Cited

U.S. PATENT DOCUMENTS

| | | |
|---|---|---|
| 7,491,522 B2 | 2/2009 | Haraldsson et al. |
| 2015/0252288 A1 | 9/2015 | Harata et al. |
| 2017/0252315 A1 | 9/2017 | Doisaki et al. |
| 2018/0147176 A1 | 5/2018 | Doisaki et al. |
| 2018/0187126 A1 | 7/2018 | Yamaguchi et al. |
| 2018/0195021 A1 | 7/2018 | Kosuge et al. |
| 2019/0015375 A1 | 1/2019 | Doisaki et al. |

FOREIGN PATENT DOCUMENTS

| | | | |
|---|---|---|---|
| JP | 2011-147435 A | | 8/2011 |
| JP | 2011-147436 A | | 8/2011 |
| JP | 2014-515940 A | | 7/2014 |
| JP | 2015-142530 A | | 8/2015 |
| JP | 2015142530 A | * | 8/2015 |
| WO | WO 2012/169718 A1 | | 12/2012 |
| WO | WO 2014/054435 A1 | | 4/2014 |
| WO | WO 2015/057139 A1 | | 4/2015 |
| WO | WO 2016/043251 A1 | | 3/2016 |
| WO | WO 2017/038861 A1 | | 3/2017 |

OTHER PUBLICATIONS

Merkle et al., "Impact offish species and processing technology on minor fish oil components," Food Control, 2017 (Nov. 4, 2016), 73:1379-1387. (Year: 2017).*

Merkle et al., "Impact of fish species and processing technology on minor fish oil components," Food Control, 2017 (Nov. 4, 2016), 73:1379-1387.

Shimizu et al., "Generation of 3-monochloro-1, 2-propanediol and related materials from tri-, di-, and monoolein at deodorization temperature," Eur. J. Lipid Sci. Technol., 2012, 114:1268-1273.

Shimizu et al., "Influence of chloride and glycidyl-ester on the generation of 3-MCPD- and glycidyl-esters," Eur. J. Lipid Sci. Technol., 2013, 115:735-739.

Zhang et al., "Formation of 3-Monochloro-1,2-propanediol (3-MCPD) Di- and Monoesters from Tristearoylglycerol (TSG) and the Potential Catalytic Effect of Fe2+ and Fe3+," Journal of Agriculture and Food Chemistry, 2015, 63:1839-1848.

* cited by examiner

*Primary Examiner* — Deborah D Carr
(74) *Attorney, Agent, or Firm* — Foley & Lardner LLP

(57) ABSTRACT

PROBLEM To provide a composition comprising highly enriched PUFA or its alkyl esters while containing fatty acid esters of 3-MCPD at adequately low concentrations and to provide an efficient method for producing the composition. MEANS FOR SOLVING A composition that contains fatty acids or fatty acid alkyl esters as its major component, the composition containing highly unsaturated fatty acid or alkyl ester thereof, wherein the proportion of the highly unsaturated fatty acid in the constituent fatty acids of the composition is 50 area % or more and wherein the concentration of 3-MCPD as found upon analyzing the composition by American Oil Chemists' Society official method Cd 29b-13 assay A is less than 1.80 ppm.

5 Claims, No Drawings

COMPOSITION CONTAINING HIGHLY UNSATURATED FATTY ACID OR ALKYL ESTER THEREOF AND A METHOD FOR PRODUCING THE SAME

CROSS-REFERENCE TO RELATED APPLICATIONS

This application is a Continuation of U.S. application Ser. No. 16/404,662, filed May 6, 2019, which claims priority to JP 2018-232498, filed Dec. 12, 2018.

TECHNICAL FIELD

The present invention relates to a composition containing highly unsaturated fatty acid or alkyl ester thereof, and to a method for producing the same.

BACKGROUND ART

The compound 3-chloropropane-1,2-diol (3-MCPD) is suspected of carcinogenicity and various countries and regions including EU have regulations on the concentration of 3-MCPD in food products. It is also known that 3-MCPD is produced in fats and oils with diacylglycerol (DAG) or monoacylglycerol (MAG) working as a substrate (Non-Patent Document 1). Ever since the reporting of 3-MCPD present in diacylglycerol (DAG)-rich fats and oils, attempts have been made to reduce its content in the fats and oils by various methods. For example, with 3-MCPD being known to form at high temperatures, Patent Documents 1 and 2 disclose that the concentrations of 3-MCPD forming substances in the fats and oils can be reduced by treatment with an adsorbent, by lowering the deodorizing temperature, or by shortening the treatment time. However, these methods are specifically intended for reducing the concentrations of substances that form 3-MCPD in the production of triacylglycerol and Patent Documents 1 and 2 do not describe any method for reducing the concentrations of fatty acid esters of 3-MCPD in the production of alkyl esters.

Polyvalent unsaturated fatty acids (PUFAs) are known to have a variety of functional properties and highly enriched PUFAs are utilized in food products, supplements, pharmaceuticals or cosmetics. In the process of enhanced enrichment, whereby the proportion of the desired PUFA(s) is increased among the fatty acids of a starting composition, PUFAs undergo conversion from triacylglycerol-based glycerides to alkyl esters with lower alcohols. Hence, highly refined and enriched PUFAs which are used in food products, supplements, pharmaceuticals or cosmetics are in most cases in the form of alkyl esters. No method has been known to date that is capable of reducing the concentrations of fatty acid esters of 3-MCPD in those highly enriched alkyl esters of PUFAs.

Factors that are known to affect the formation of fatty acid esters of 3-MCPD include a chlorine source, substrates such as MAG and DAG, as well as the time of treatment at high temperature (Non-Patent Documents 1 and 2). However oils that are used as the raw material for PUFA-containing food products and so forth typically contain such small amounts of chlorine sources and substrates, such as MAG and DAG, for fatty acid esters of 3-MCPD, that their effects on the refining of the end product PUFA are extremely small and the need to remove them is not generally recognized. In this connection, complete removal of chlorine sources and substrates such as MAG and DAG is not currently performed for reasons of the technical difficulties involved and the potential effects on productivity such as the percent recovery of PUFAs.

Rectification is a distillation technique that can potentially achieve high separation performance; on the other hand, it requires an internal packing and refluxing, which often results in the need for heating at temperatures higher than 150° C. Molecular distillation and short-path distillation which involve heating temperatures not higher than 150° C. can be performed at relatively lower temperatures than rectification; however, in order to achieve satisfactory enrichment of PUFA, repeated processing is required and this presents the risk of forming large amounts of 3-MCPD in the distillation of PUFA.

Urea adduct formation and HPLC are techniques that perform separation in accordance with the structures (e.g., chain length, the number of double bonds, and so forth) of fatty acids that constitute the molecule to be separated; however, if the starting material contains 3-MCPD in the form of di- or mono-fatty acid esters, they are difficult, depending on the types of the constituent fatty acids, to separate from the desired alkyl esters, with the result that fatty acid alkyl esters with a reduced content of fatty acid esters of 3-MCPD are difficult to obtain in a consistent manner.

Hence, refining steps such as solvent removal and distillation that include a heating procedure obviously involve the risk of forming fatty acid esters of 3-MCPD and even methods such as urea adduct formation and HPLC are not necessarily capable of removing the various fatty acid esters of 3-MCPD that are contained in the starting material.

PRIOR ART LITERATURE

Patent Literature

Patent Document 1: JP 2011-147435 A
Patent Document 2: JP 2011-147436 A

Non-Patent Literature

Non-Patent Document 1: Eur. J. Lipid Sci. Technol. 114, 1268-1273 (2012)
Non-Patent Document 2: Eur. J. Lipid Sci. Technol. 115, 735-739 (2013)
Non-Patent Document 3: J. Agric. Food. Chem. 63(6), 1839-48 (2015)

SUMMARY OF INVENTION

Technical Problem

In many cases, PUFA-containing fats and oils also contain 3-MCPD or its fatty acid esters that derive from the starting material or result from the oil pressing (extraction) and refining steps. When the glycerides in the fats and oils are alkyl esterified, MAG and DAG will remain or their concentrations are more likely to increase, creating an environment in which fatty acid esters of 3-MCPD are prone to form. Furthermore, the refining of alkyl esters often involves the step of solvent removal as well as distillation steps such as molecular distillation, short-path distillation, and rectification, and fatty acid esters of 3-MCPD can form in each of these steps. In chromatography and urea adduct formation, no external temperature is applied, so the possibility for the formation of fatty acid esters of 3-MCPD is low but, on the other hand, there is a risk that the concentrations of fatty acid esters of 3-MCPD that are already contained cannot be adequately reduced.

An object, therefore, of the present invention is to provide a composition comprising highly enriched PUFA or alkyl ester thereof while containing fatty acid esters of 3-MCPD at adequately low concentrations and to provide an efficient method for producing the composition.

Solution to Problem

The present inventors conducted an intensive study with a view to attaining the above-stated objects and have found that C20-C22 fatty acid alkyl ester fractions, which are to be enriched in PUFA, and 3-MCPD mono-fatty acid esters, which have one molecule of C14 or C16 fatty acid bound thereto, show similar behaviors in distillation. The present inventors further found that by reducing the content of a monoacyl glycerol (MAG), especially one having the C14 or C16 fatty acid bound thereto, that is present in the starting material, the concentrations of the mono-fatty acid esters of 3-MCPD in the C20-C22 fatty acid alkyl ester fractions can be reduced.

The present inventors have also found that the rate at which the fatty acid esters of 3-MCPD form varies considerably depending on the change in the concentration of a trace (≤1 ppm) metal such as iron that is contained in the starting material. It had been reported that the iron content would have an effect on the formation of fatty acid esters of 3-MCPD from triacyl glycerol (Non-Patent Document 3). However, the disclosure in Non-Patent Document 3 is about the result of a study on the formation of fatty acid esters of 3-MCPD in the presence of a considerably large amount of $Fe^{2+}$ or $Fe^{3+}$ and it was not known that the trace iron usually contained in the oil as the raw material for the production of PUFA alkyl esters would have an effect on the formation of fatty acid esters of 3-MCPD.

The yet-to-be-enriched PUFA alkyl esters as produced from fish oil and other raw materials are generally low in the degree of refinement, so their iron concentration can vary depending on the iron content in the oil as the starting material. The iron concentration of the yet-to-be-enriched PUFA alkyl esters can also vary considerably depending on other factors including the quality of the starting oil to be extracted, the method of extraction, and the method of refining. Therefore, if the iron concentration is increased, heating treatments such as distillation can lead to an unexpectedly high concentration of fatty acid esters of 3-MCPD. We find that such an unexpected rise in the concentration of fatty acid esters of 3-MCPD can be effectively suppressed by ensuring that the concentration of iron before the heat treatment such as distillation is adjusted to less than 0.20 ppm.

The present inventors conducted further studies based on these findings and have finally accomplished the present invention.

Briefly, the present invention relates to the following:

[1] A composition that contains fatty acids or fatty acid alkyl esters as its major component, the composition containing highly unsaturated fatty acid or alkyl ester thereof, wherein the proportion of the highly unsaturated fatty acid in the constituent fatty acids of the composition is 50 area % or more and wherein the concentration of 3-MCPD as found upon analyzing the composition by American Oil Chemists' Society official method Cd 29b-13 assay A is less than 1.80 ppm.

[2] The composition according to [1], wherein the proportion of the highly unsaturated fatty acid in the constituent fatty acids of the composition is 70 area % or more.

[3] The composition according to [1] or [2], wherein the concentration of 3-MCPD as found upon analyzing the composition by American Oil Chemists' Society official method Cd 29b-13 assay A is less than a detection limit.

[4] The composition according to any one of [1] to [3], wherein the highly unsaturated fatty acid is eicosapentaenoic acid, docosahexaenoic acid, dihomo-γ-linolenic acid, arachidonic acid, or a combination thereof.

[5] The composition according to any one of [1] to [4], which is a distillation product.

[6] The composition according to any one of [1] to [5], wherein a raw material of the composition is a fish oil, a microorganism oil, a vegetable oil or a marine animal oil.

[7] A distillation feed composition containing a highly unsaturated fatty acid alkyl ester,
wherein the highly unsaturated fatty acid alkyl ester comprises a highly unsaturated fatty acid alkyl ester to be enriched and
wherein the concentration of monoacyl glycerol comprising as constituent fatty acid a fatty acid having 5 or more carbon atoms fewer than the highly unsaturated fatty acid which constitutes the highly unsaturated fatty acid alkyl ester to be enriched is less than 10,000 ppm and/or the iron concentration is less than 0.20 ppm.

[8] The composition according to [7], wherein the concentration of monoacyl glycerol comprising as the constituent fatty acid a fatty acid having 6 carbon atoms fewer than the highly unsaturated fatty acid which constitutes the highly unsaturated fatty acid alkyl ester to be enriched is less than 10,000 ppm.

[9] The composition according to [7] or [8], wherein the chlorine concentration is less than 10 ppm.

[10] The composition according to any one of [7] to [9], wherein the highly unsaturated fatty acid alkyl ester to be enriched is an alkyl ester of eicosapentaenoic acid, docosahexaenoic acid, dihomo-γ-linolenic acid, or arachidonic acid, or a combination thereof.

[11] The composition according to any one of [7] to [10], wherein a raw material of the composition is a fish oil, a microorganism oil, a vegetable oil or a marine animal oil.

[12] A method for producing a composition containing a highly unsaturated fatty acid or an alkyl ester thereof, which comprises:
(1) alkyl esterifying a raw material containing a triglyceride comprising a highly unsaturated fatty acid as constituent fatty acid to prepare a composition containing a highly unsaturated fatty acid alkyl ester;
(2) at least one selected from among (a) reducing to less than 10,000 ppm the concentration of a monoacyl glycerol that comprises as constituent fatty acid a fatty acid that has 5 or more carbon atoms fewer than the highly unsaturated fatty acid that constitutes the highly unsaturated fatty acid alkyl ester to be enriched in the composition prepared in step (1), (b) reducing the iron concentration in the composition prepared in step (1) to less than 0.20 ppm, and (c) reducing the chlorine concentration in the composition prepared in step (1) to less than 10 ppm; and
(3) distilling the composition resulting from step (2) and collecting the main distillate fraction.

[13] The method according to [12], wherein the concentration of 3-MCPD as found upon analyzing the main distillate fraction from step (3) by American Oil Chemists' Society official method Cd 29b-13 assay A is less than 1.80 ppm.

[14] The method according to [12] or [13], wherein step (2)(a) is performed by silica gel chromatography.
[15] The method according to any one of [12] to [14], wherein distillation in step (3) is rectification.
[16] The method according to any one of [12] to [15], wherein the concentration of monoacyl glycerol comprising as the constituent fatty acid a fatty acid that has 6 carbon atoms fewer than the highly unsaturated fatty acid that constitutes the highly unsaturated fatty acid alkyl ester to be enriched is reduced to less than 10,000 ppm in step (2).
[17] The method according to any one of [12] to [16], wherein the highly unsaturated fatty acid is eicosapentaenoic acid, docosahexaenoic acid, dihomo-γ-linolenic acid, arachidonic acid, or a combination thereof.
[18] The method according to any one of [12] to [17], wherein the raw material is a fish oil, a microorganism oil, a vegetable oil or a marine animal oil.

In one aspect, the present invention relates to the following:
[A1] A composition containing highly unsaturated fatty acid or alkyl ester thereof, wherein the proportion of the highly unsaturated fatty acid in the constituent fatty acids of the composition is 50 area % or more and wherein the concentration of 3-MCPD as found upon analyzing the composition by American Oil Chemists' Society official method Cd 29b-13 assay A is less than 1.80 ppm.
[A2] The composition according to [A1], wherein the proportion of the highly unsaturated fatty acid in the constituent fatty acids of the composition is 70 area % or more.
[A3] The composition according to [A1] or [A2], wherein the concentration of 3-MCPD as found upon analyzing the composition by American Oil Chemists' Society official method Cd 29b-13 assay A is less than a detection limit.
[A4] The composition according to any one of [A1] to [A3], wherein the highly unsaturated fatty acid is eicosapentaenoic acid, docosahexaenoic acid, dihomo-γ-linolenic acid, arachidonic acid, or a combination thereof.
[A5] The composition according to any one of [A1] to [A4], which is a distillation product.
[A6] The composition according to any one of [A1] to [A5], which is produced from a raw material derived from a fish oil, a microorganism oil, a vegetable oil or a marine animal oil.
[A7] A distillation feed composition containing a highly unsaturated fatty acid alkyl ester,
    wherein the highly unsaturated fatty acid alkyl ester comprises a highly unsaturated fatty acid alkyl ester to be enriched and
    wherein the concentration of monoacyl glycerol comprising as constituent fatty acid a fatty acid having 5 or more carbon atoms fewer than the highly unsaturated fatty acid which constitutes the highly unsaturated fatty acid alkyl ester to be enriched is less than 10,000 ppm or the iron concentration is less than 0.20 ppm.
[A8] The composition according to [A7], wherein the concentration of monoacyl glycerol comprising as the constituent fatty acid a fatty acid having 6 carbon atoms fewer than the highly unsaturated fatty acid which constitutes the highly unsaturated fatty acid alkyl ester to be enriched is less than 10,000 ppm.
[A9] The composition according to [A7] or [A8], wherein the chlorine concentration is less than 10 ppm.
[A10] The composition according to any one of [A7] to [A9], wherein the highly unsaturated fatty acid alkyl ester to be enriched is an alkyl ester of eicosapentaenoic acid, docosahexaenoic acid, dihomo-γ-linolenic acid, or arachidonic acid, or a combination thereof.
[A11] The composition according to any one of [A7] to [A10], wherein a raw material of the composition is derived from a fish oil, a microorganism oil, a vegetable oil or a marine animal oil.
[A12] A method for producing a composition containing a highly unsaturated fatty acid or an alkyl ester thereof, which comprises:
(1) alkyl esterifying a raw material containing a triglyceride comprising a highly unsaturated fatty acid as constituent fatty acid to prepare a composition containing a highly unsaturated fatty acid alkyl ester;
(2) at least one selected from among (a) reducing to less than 10,000 ppm the concentration of a monoacyl glycerol that comprises as constituent fatty acid a fatty acid that has 5 or more carbon atoms fewer than the highly unsaturated fatty acid that constitutes the highly unsaturated fatty acid alkyl ester to be enriched in the composition prepared in step (1), (b) reducing the iron concentration in the composition prepared in step (1) to less than 0.20 ppm, and (c) reducing the chlorine concentration in the composition prepared in step (1) to less than 10 ppm; and
(3) distilling the composition resulting from step (2) and collecting the main distillate fraction.
[A13] The method according to [A12], wherein the concentration of 3-MCPD as found upon analyzing the main distillate fraction from step (3) by American Oil Chemists' Society official method Cd 29b-13 assay A is less than 1.80 ppm.
[A14] The method according to [A12] or [A13], wherein step (2)(a) is performed by silica gel chromatography.
[A15] The method according to any one of [A12] to [A14], wherein distillation in step (3) is rectification.
[A16] The method according to any one of [A12] to [A15], wherein the concentration of monoacyl glycerol comprising as the constituent fatty acid a fatty acid that has 6 carbon atoms fewer than the highly unsaturated fatty acid that constitutes the highly unsaturated fatty acid alkyl ester to be enriched is reduced to less than 10,000 ppm in step (2).
[A17] The method according to any one of [A12] to [A16], wherein the highly unsaturated fatty acid is eicosapentaenoic acid, docosahexaenoic acid, dihomo-γ-linolenic acid, arachidonic acid, or a combination thereof.
[A18] The method according to any one of [A12] to [A17], wherein the raw material is derived from a fish oil, a microorganism oil, a vegetable oil or a marine animal oil.

Advantageous Effects of Invention

According to the present invention, compositions comprising high concentrations of PUFA or PUFA alkyl esters while containing fatty acid esters of 3-MCPD at low concentrations can be produced in a consistent manner.

DESCRIPTION OF EMBODIMENTS

On the following pages, the present invention are described in detail. Hereinafter, fatty acids are sometimes designated using numerical expressions in which the number of carbon atoms, the number of double bonds and the positions of double bonds are indicated in a simplified way by combining numbers and letters in the alphabet. For instance, a saturated fatty acid having 20 carbon atoms may be designated as "C20:0", a monovalent unsaturated fatty acid having 18 carbon atoms designated as "C18:1", eicosapentaenoic acid designated as "C20:5 n-3", and so on. The symbol "n-" represents the position of a double bond as counted from the terminal methyl group in a fatty acid; for example, "n-3" indicates that the bond between the third and fourth carbon atoms as counted from the terminal methyl group in a fatty acid is a double bond. This method of designation is well known to persons skilled in the art and fatty acids designated in accordance with this method can be readily identified by any person skilled in the art.

As used herein, the team "highly unsaturated fatty acids" means fatty acids having 18 or more carbon atoms and 3 or more double bonds. Highly unsaturated fatty acids can, for example, be fatty acids having 20 or more carbon atoms and 3 or more or even 4 or more double bonds, or fatty acids having 20 or more carbon atoms and 5 or more double bonds. Exemplary highly unsaturated fatty acids include α-linolenic acid (18:3 n-3), γ-linolenic acid (18:3 n-6), dihomo-γ-linolenic acid (20:3 n-6), arachidonic acid (20:4 n-6), eicosapentaenoic acid (C20:5 n-3), docosapentaenoic acid (22:5 n-6), and docosahexaenoic acid (22:6 n-3).

As used herein, the term "crude oil" means an oil that is a mixture of the lipids, as extracted from organisms. As used herein, the term "refined oil" means an oil that is obtained from crude oil by performing at least one fat/oil refining step selected from the group consisting of a degumming step, a deacidifying step, a decoloring step and a deodorizing step so that off-target substances such as phospholipids and sterols will be removed from the crude oil. A person skilled in the art can distinguish a crude oil from a refined oil by routine analysis.

As used herein, a composition containing highly unsaturated fatty acids or alkyl esters thereof means either a fatty acid composition containing highly unsaturated fatty acids or a fatty acid alkyl ester composition containing alkyl esters of highly unsaturated fatty acids. Here, the fatty acid composition is a composition containing fatty acids as major constituents, and the fatty acid alkyl ester composition is a composition containing alkyl esters of fatty acids as major constituents.

As used herein, collective terms (such as highly unsaturated fatty acids, alkyl esters of highly unsaturated fatty acids, etc.) do not exclude the possibility for the presence of multiple constituents unless the context clearly indicates to the contrary. Hence, collective terms usually mean the presence of at least one constituent.

<Compositions Containing Highly Unsaturated Fatty Acids or Alkyl Esters Thereof, with Reduced Concentrations of Fatty Acid Esters of 3-MCPD>

The present invention provides a composition containing highly unsaturated fatty acids or alkyl esters thereof, wherein the proportion of highly unsaturated fatty acids in the constituent fatty acids of the composition is 50 area % or more and wherein the concentration of 3-MCPD as found upon analyzing the composition by American Oil Chemists' Society official method Cd 29b-13 assay A is less than 1.80 ppm (hereinafter, the composition is sometimes referred to as the composition of the present invention.)

In the present invention, the highly unsaturated fatty acid is not particularly limited if alkyl esters thereof are obtained as a main distillate upon enrichment by distillation. The highly unsaturated fatty acid may be eicosapentaenoic acid, docosahexaenoic acid, dihomo-γ-linolenic acid, arachidonic acid, or combinations thereof. In preferred embodiments, the highly unsaturated fatty acid can be eicosapentaenoic acid, docosahexaenoic acid, or a combination thereof. In more preferred embodiments, the highly unsaturated fatty acid can be eicosapentaenoic acid.

The proportion of highly unsaturated fatty acids in the constituent fatty acids of the composition of the present invention can be 50 area % or more, for example, 55 area % or more, 60 area % or more, 65 area % or more, 70 area % or more, 75 area % or more, 80 area % or more, 85 area % or more, 90 area % or more, 95 area % or more, or 96 area % or more. On the other hand, in one embodiment, the proportion of highly unsaturated fatty acids in the constituent fatty acids of the composition of the present invention can be 99 area % or less, for example, 98 area % or less, 95 area % or less, 90 area % or less, 85 area % or less, 80 area % or less, 75 area % or less, 70 area % or less, 65 area % or less, 60 area % or less, or 55 area % or less. The proportion of highly unsaturated fatty acids in the constituent fatty acids of the composition of the present invention may be e.g. from 50 to 99 area %, from 50 to 98 area %, from 50 to 95 area %, from 50 to 90 area %, from 50 to 85 area %, from 50 to 80 area %, from 50 to 75 area %, from 50 to 70 area %, from 50 to 65 area %, from 50 to 60 area %, from 55 to 99 area %, from 55 to 98 area %, from 55 to 95 area %, from 55 to 90 area %, from 55 to 85 area %, from 55 to 80 area %, from 55 to 75 area %, from 55 to 70 area %, from 55 to 65 area %, from 55 to 60 area %, from 60 to 99 area %, from 60 to 98 area %, from 60 to 95 area %, from 60 to 90 area %, from 60 to 85 area %, from 60 to 80 area %, from 60 to 75 area %, from 65 to 99 area %, from 65 to 98 area %, from 65 to 95 area %, from 65 to 90 area %, from 65 to 85 area %, from 65 to 80 area %, from 65 to 75 area %, from 70 to 99 area %, from 70 to 98 area %, from 70 to 95 area %, from 70 to 90 area %, from 70 to 85 area %, from 70 to 80 area %, from 70 to 75 area %, from 75 to 99 area %, from 75 to 98 area %, from 75 to 95 area %, from 75 to 90 area %, from 75 to 85 area %, or from 75 to 80 area %.

In one aspect the highly unsaturated fatty acid can be eicosapentaenoic acid, and the proportion of highly unsaturated fatty acids in the constituent fatty acids of the composition of the present invention can be from 50 to 99 area %, from 50 to 98 area %, from 50 to 95 area %, from 50 to 90 area %, from 50 to 85 area %, from 50 to 80 area %, from 50 to 75 area %, from 50 to 70 area %, from 50 to 65 area %, from 50 to 60 area %, from 55 to 99 area %, from 55 to 98 area %, from 55 to 95 area %, from 55 to 90 area %, from 55 to 85 area %, from 55 to 80 area %, from 55 to 75 area %, from 55 to 70 area %, from 55 to 65 area %, or from 55 to 60 area %.

In another aspect the highly unsaturated fatty acid can be eicosapentaenoic acid, and the proportion of highly unsaturated fatty acids in the constituent fatty acids of the composition of the present invention can be from 60 to 99 area %, from 60 to 98 area %, from 60 to 95 area %, from 60 to 90 area %, from 60 to 85 area %, from 65 to 99 area %, from 65 to 98 area %, from 65 to 95 area %, from 65 to 90 area %, from 65 to 85 area %, from 70 to 99 area %, from 70 to 98 area %, from 70 to 95 area %, from 70 to 90 area %, from 70 to 85 area %, from 75 to 99 area %, from 75 to 98 area %, from 75 to 95 area %, from 75 to 90 area %, or from 75 to 85 area %.

In yet another aspect the highly unsaturated fatty acid can be eicosapentaenoic acid, and the proportion of highly unsaturated fatty acids in the constituent fatty acids of the composition of the present invention can be from 60 to 80 area %, from 65 to 80 area %, from 70 to 80 area %, or from 75 to 80 area %.

Having high proportions of highly unsaturated fatty acids, the composition of the present invention is suitable as materials for the manufacture of pharmaceuticals or supplements that contain highly unsaturated fatty acid as an active ingredient.

As used herein, the term "area %" which represents the proportion of highly unsaturated fatty acids in the constituent fatty acids of a composition may be explained as follows: the composition is analyzed by using a gas chromatograph equipped with a hydrogen flame ionization detector (FID) (GC-FID); the peaks of the respective components in the obtained chart are identified and the peak areas for the respective fatty acids are determined using Agilent ChemStation integrating algorithm (Revision C.01.03[37], Agilent Technologies); "area %" is the proportion of an individual peak area relative to the total sum of the peak areas for the respective fatty acids, and represents the relative content of the component at that peak. In the field of oil chemistry, area % is used as a unit practically synonymous with wt %. See the Standard Methods for the Analysis of Fats, Oils and Related Materials established by Japan Oil Chemists' Society (JOCS), 2013 Edition, 2.4.2.1-2013, Makeup of Fatty Acids (FID constant temperature gas chromatography) and Id. 2.4.2.2-2013, Makeup of Fatty Acids (FID elevated temperature gas chromatography). Analysis conditions for gas chromatography are as set out below.

GC-FID Measurement Conditions
GC: 6890N (Agilent Technologies)
Column: DB-WAX (Agilent Technologies)
30 m×0.25 mm ID, 0.25 µm film thickness
Carrier gas: helium, 1 mL/min
Injection port: 250° C., 1 µL, Split (1:100)
Column temperature: 180° C.=>3° C./min=>230° C., retained for 15 min
Detector: FID, 250° C.
Makeup gas: nitrogen, 45 ml/min.

In embodiments where the composition of the present invention is a fatty acid composition containing highly unsaturated fatty acid, the proportion of the highly unsaturated fatty acid in the constituent fatty acids is determined by the following method. Briefly, in accordance with AOCS official method Ce 1b-89, the fatty acid composition is methyl esterified and then subjected to GC under the foregoing conditions, with the area % of the highly unsaturated fatty acids being calculated in the same way as noted above.

In this case, the constituent fatty acids of the composition means free fatty acids in the fatty acid composition.

In embodiments where the composition of the present invention is a fatty acid alkyl ester composition containing alkyl esters of highly unsaturated fatty acid, the proportion of the highly unsaturated fatty acid in the constituent fatty acids of the composition is determined by the following method. Briefly, the fatty acid alkyl ester composition is analyzed by gas chromatography under the foregoing conditions and the proportion of the peak areas for the highly unsaturated fatty acid alkyl esters relative to the total sum of the peak areas for the fatty acid alkyl esters (area %) is calculated.

In this case, the constituent fatty acids of the composition means the fatty acids that constitute the fatty acid alkyl esters in the fatty acid alkyl ester composition.

The alkyl group in the highly unsaturated fatty acid alkyl esters is an alkyl group that is derived from lower alcohols commonly used in alkyl esterification of fatty acids, and may be exemplified by an alkyl group having one carbon atom (a methyl group) or two carbon atoms (an ethyl group). In preferred embodiments, the highly unsaturated fatty acid alkyl esters may be highly unsaturated fatty acid ethyl esters.

The composition of the present invention is such that the concentration of 3-MCPD as found upon analyzing the composition by American Oil Chemists' Society official method Cd 29b-13 assay A has been reduced to less than 1.80 ppm (mg/kg), for example, less than 1.70 ppm, less than 1.60 ppm, less than 1.50 ppm, less than 1.40 ppm, less than 1.30 ppm, less than 1.20 ppm, less than 1.10 ppm, less than 1.00 ppm, less than 0.90 ppm, less than 0.80 ppm, less than 0.70 ppm, less than 0.60 ppm, less than 0.50 ppm, less than 0.40 ppm, less than 0.30 ppm, less than 0.20 ppm, less than 0.10 ppm, less than 0.09 ppm, less than 0.08 ppm, less than 0.07 ppm, less than 0.06 ppm, less than 0.05 ppm, less than 0.04 ppm, less than 0.03 ppm, less than 0.02 ppm, or less than 0.01 ppm. In some embodiments, the concentration of 3-MCPD is more than zero ppm. On the other hand, in one embodiment, the composition of the present invention is such that the concentration of 3-MCPD as found upon analyzing the composition by American Oil Chemists' Society official method Cd 29b-13 assay A can be 0.01 ppm or more, for example, 0.02 ppm or more. Also, the composition of the present invention may be such that the concentration of 3-MCPD as found upon analyzing the composition by American Oil Chemists' Society official method Cd 29b-13 assay A can be 0.01 ppm or more, and less than 1.80 ppm, less than 1.70 ppm, less than 1.60 ppm, less than 1.50 ppm, less than 1.40 ppm, less than 1.30 ppm, less than 1.20 ppm, less than 1.10 ppm, less than 1.00 ppm, less than 0.90 ppm, less than 0.80 ppm, less than 0.70 ppm, less than 0.60 ppm, less than 0.50 ppm, less than 0.40 ppm, less than 0.30 ppm, less than 0.20 ppm, less than 0.10 ppm, less than 0.09 ppm, less than 0.08 ppm, less than 0.07 ppm, less than 0.06 ppm, less than 0.05 ppm, less than 0.04 ppm, less than 0.03 ppm, or less than 0.02 ppm. Also, the composition of the present invention may be such that the concentration of 3-MCPD as found upon analyzing the composition by American Oil Chemists' Society official method Cd 29b-13 assay A can be 0.02 ppm or more, and less than 1.80 ppm, less than 1.70 ppm, less than 1.60 ppm, less than 1.50 ppm, less than 1.40 ppm, less than 1.30 ppm, less than 1.20 ppm, less than 1.10 ppm, less than 1.00 ppm, less than 0.90 ppm, less than 0.80 ppm, less than 0.70 ppm, less than 0.60 ppm, less than 0.50 ppm, less than 0.40 ppm, less than 0.30 ppm, less than 0.20 ppm, less than 0.10 ppm, less than 0.09 ppm, less than 0.08 ppm, less than 0.07 ppm, less than 0.06 ppm, less than 0.05 ppm, less than 0.04 ppm, or less than 0.03 ppm.

As herein referred to, analysis by American Oil Chemists' Society (AOCS) official method Cd 29b-13 assay A is performed by the following procedure which is familiar to a skilled person.

To 100 mg of a sample, 100 µL of a standard solution of 3-MCPD-d5-dipalmitate (diluted with toluene to make 5 ppm 3-MCPD-d5) and 600 µL of diethyl ether are added and after mixing under stirring until the sample is completely dissolved, the mixture is cooled at between −22° C. and −25° C. for about 15 minutes. Subsequently, 350 µL of a methanol solution of sodium hydroxide (0.25 g of sodium hydroxide is dissolved in 100 mL of methanol) is added and the mixture is stirred thoroughly, followed by reaction at between −22° C. and −25° C. for 16 hours or longer. At the same temperature, 600 µL of an acidic solution of sodium bromide (as prepared by dissolving 600 g of sodium bromide in 1 L of purified water and then adding 3 mL of 85% phosphoric acid) is added to quench the reaction and the organic layer separated from the aqueous layer is bubbled with nitrogen until it is concentrated to a volume of about 100 µL. Subsequently, 600 µL of hexane is added and after vigorous agitation, the mixture is allowed to settle for 5 to 10 minutes undisturbed so as to remove the organic layer; this process is repeated twice. To the remaining aqueous layer, 600 µL of a liquid mixture of diethyl ether and ethyl acetate (3:2, V/V) is added and the mixture is vigorously agitated, followed by recovery of the organic layer; this process is repeated three times. The three recovered organic layers are combined and dehydrated with anhydrous sodium sulfate. The dehydrated organic layer is bubbled with nitrogen until it is concentrated to a volume of 200 μL; subsequently, 20 μL of a solution of saturated phenylboronic acid in diethyl ether is added and mixture is vigorously agitated for 10 seconds; the mixture is then bubbled with nitrogen to remove the solvent entirely. To the residue, 200 μL of isooctane is added and the mixture is vigorously agitated for 10 seconds and the resulting solution is used as a sample for GC-MS.

To construct a calibration curve for quantification of 3-MCPD, 3-MCPD-dipalmitate is dissolved in toluene to give 3-MCPD concentrations of 0 ppm, 0.5 ppm, 1 ppm and 5 ppm to prepare standard solutions of 3-MCPD, which are analyzed in the same manner as with the sample described above.

Analysis conditions for GC-MS are as set out below.
GC-MS Conditions
GC: GC-2010 and GCMS-QP2010 (SHIMADZU)
Column: DB-5 ms (Agilent Technologies)
30 m×0.25 mm ID, 0.25 μm film thickness
Carrier gas: helium, 1.2 mL/min
Injection port: 250° C., 1 splitless, sampling time 1 min
Column temperature: 85° C., retained for 0.5 min=>6° C./min=>150° C., retained for 5 min=>12° C./min=>180° C.=>25° C./min=>280° C., retained for 7 min.
Ionization temperature: 200° C.
Interface temperature: 200° C.
Ionization method: EI; SIM monitoring was conducted at the following values of m/z:
3-MCPD-d5: m/z=149, 150, 201, 203
3-MCPD: m/z=146, 147, 196, 198

For quantification, m/z values of 150 for 3-MCPD-d5 and 147 for 3-MCPD are used, and the other values are used to verify the target substances.

In the above-described method of analysis, 3-MCPD in the sample, whether it is a free or an ester form, is detected as 3-MCPD per se. Hence, measured values obtained in the above-described method of analysis represent the sum content (ppm (mg/kg)) of the free form of 3-MCPD initially present in the sample and a free form of 3-MCPD that can be formed from the ester form of 3-MCPD.

In one aspect herein the composition of the present invention is such that the concentration of 3-MCPD as found upon analyzing the composition by American Oil Chemists' Society official method Cd 29b-13 assay A can be 0 ppm or more, and less than 1.80 ppm. In this case, the composition of the present invention can encompass a 3-MCPD-free composition. In other embodiments, the composition of the present invention contains 3-MCPD (namely, 3-MCPD or a fatty acid ester of 3-MCPD) and the concentration of 3-MCPD as found upon analyzing the composition by American Oil Chemists' Society official method Cd 29b-13 assay A can be less than 1.80 ppm.

The composition of the present invention may be such that the concentration of 3-MCPD as found upon analyzing the composition by American Oil Chemists' Society official method Cd 29b-13 assay A is less than the lower limit of quantification, preferably less than a detection limit of the method of American Oil Chemists' Society official method Cd 29b-13 assay A.

Highly unsaturated fatty acids such as eicosapentaenoic acid are known to be abundant in certain kinds of microorganism oils, vegetable oils or marine animal oils. Hence, these can be used as raw materials for the composition of the present invention. Raw materials for the composition of the present invention may specifically be exemplified by: fish oils such as sardine oil, tuna oil, bonito oil, menhaden oil, cod liver oil, herring oil, capelin oil, and salmon oil; marine animal oils derived from crustaceans such as krill; vegetable oils as derived from *perilla*, flax, soybean, and rapeseed; and oils derived from lipid-producing microorganisms including yeasts such as the genus *Yarrowia*, filamentous fungi belonging, for example, to the genus *Mortierella*, the genus *Penicillium*, the genus *Aspergillus*, the genus *Rhodotorula*, and the genus *Fusarium*, algae such as the genus *Euglena*, and stramenopiles. The composition of the present invention may be an oil derived from genetically engineered microorganisms transfected with a gene such as a genetically modified variant Δ9 elongase gene. Alternatively, oils derived from genetically engineered plants, namely, oilseed plants such as species of the genus *Brassica*, sunflower, corn, cotton, flax, and safflower that have been transfected with a gene such as a variant Δ9 elongase gene by gene recombinant technology can also be used as raw materials for the composition of the present invention. Genetically engineered vegetable oils, genetically engineered microorganism oils and so forth can, for example, be illustrated by those which are disclosed in WO 2012/027698, WO 2010/033753, etc. In a preferred embodiment, the raw materials for the composition of the present invention are fish oils, microorganism oils, vegetable oils or aquatic animal oils such as marine animal oils, more preferably, fish oils.

The raw materials for the composition of the present invention contain highly unsaturated fatty acids mostly as glycerides. In fish oils, for example, many kinds of fatty acids that have 14 to 22 carbon atoms and 0 to 6 double bonds are contained as glycerides. In the presence of a catalyst or enzyme, glycerides are reacted with a lower alcohol such as ethanol to alkyl esterify the fatty acids contained in the glycerides and, thereafter, fatty acid alkyl esters other than the target highly unsaturated fatty acids (such as EPA alkyl esters) are removed, whereby highly unsaturated fatty acid alkyl esters (such as EPA alkyl esters) of high purity can be produced. In one embodiment, fatty acid alkyl esters other than the target highly unsaturated fatty acid alkyl esters (such as EPA alkyl esters) can be removed by distillation. The present inventors found that fatty acid esters of 3-MCPD derived from mono- or di-acylglycerol having relatively high molecular weights become included in large amounts into the residue left after obtaining the main distillate fraction in distillation. Hence, in preferred embodiments, the composition of the present invention can be a distillate (distilled fraction).

It is known that upon heat treatments involved in distillation, thermally denatured trans-isomers are formed from the highly unsaturated fatty acid alkyl esters (see, for example, European Journal of Lipid Science and Technology, 108 (2006) 589-597, "Geometrical isomerization of eicosapentaenoic and docosahexaenoic acid at high temperatures"; JAOCS, 66 (1989) 1822-1830, "Eicosapentaenoic acid geometrical isomer artifacts in heated fish oil esters"). Hence, in one embodiment, the composition of the present invention may further contain trans-isomers of the highly unsaturated fatty acid alkyl esters. The concentration of trans-isomers in the composition of the present invention can be 2.5 area % or less, for example, 2.3 area % or less, 2.0 area % or less, 1.8 area % or less, 1.6 area % or less, 1.4 area % or less, 1.2 area % or less, 1.0 area % or less, 0.9 area % or less, 0.8 area % or less, 0.7 area % or less, 0.6 area % or less, or 0.5 area % or less. On the other hand, the concentration of trans-isomers in the composition of the present invention can be 0.01 area % or more, for example, 0.02 area % or more, 0.03 area % or more, 0.04 area % or more, or 0.05 area % or more.

As herein referred to, the concentration of trans-isomers is a value as measured by GC analysis. Specifically, it is measured by the following procedure.

Ten milligrams of a sample is dissolved in 1 mL of hexane and subjected to GC analysis under the following conditions.
[GC Analysis Conditions]
GC: 6890N (Agilent Technologies)
Column: DB-WAX (Agilent Technologies)
30 m×0.25 mm ID, 0.25 μm film thickness
Carrier gas: helium, 1 mL/min
Injection port: 250° C., 1 μL, Split (1:100)
Column temperature: 180° C.=>3° C./min=>230° C., retained for 15 min
Detector: FID, 250° C.
Makeup gas: nitrogen, 45 mL/min.

For example, concentration of five trans-isomers (A to E) of EPA ethyl ester (EPA-E) is calculated in the following way.

Given a sample from which C21 or higher saturated fatty acids or monovalent unsaturated fatty acids have been removed by distillation, the trans-isomers of EPA ethyl ester (EPA-E) have the following relative retention times, with the retention time for EPA-E being taken as one: 0.98 to 0.99 for isomer A; 1.01 to 1.02 for isomer B; 1.02 to 1.03 for isomer C; 1.04 to 1.05 each for isomers D and E which provide overlapping peaks. Among the peaks for the five isomers, those for isomers D and E overlap, allowing a detection of four peaks. The sum of the areas of those relative retention time peaks is described as the peak area for the trans-isomers of EPA-E. The proportion of the trans-isomers to EPA-E is determined and the concentration of the isomers in the sample is calculated from the EPA-E concentration in the sample.

Given a sample that contains C21 or higher saturated fatty acids or monovalent unsaturated fatty acids, fractionation with a silver nitrate column is performed using 750 mg/6 mL of Discovery Ag-ION (Supelco) to remove the C21 or higher saturated fatty acids and monovalent unsaturated fatty acids before the foregoing analysis is conducted.

Consider, for example, the trans-isomers of dihomo-γ-linolenic acid ethyl ester (DGLA-E); the sum of the areas of the following relative retention time peaks is measured by the foregoing GC analysis and the proportion of the trans-isomers to DGLA-E is determined and the concentration of the isomers in the sample is calculated from the DGLA-E concentration in the sample.

Isomer A: relative retention time; 1.001 to 1.009
Isomer B: relative retention time; 1.01 to 1.03
(The retention time of DGLA is taken as one.)

The contents of the trans-isomers of other highly unsaturated fatty acid alkyl esters can also be measured by routine methods.

The composition of the present invention may be such that upon gas chromatographic measurement under the foregoing analysis conditions, the concentration of trans-isomers of an EPA alkyl ester can be 2.5 area % or less, for example, 2.3 area % or less, 2.0 area % or less, 1.8 area % or less, 1.6 area % or less, 1.4 area % or less, 1.2 area % or less, 1.0 area % or less, 0.9 area % or less, 0.8 area % or less, 0.7 area % or less, 0.6 area % or less, or 0.5 area % or less. On the other hand, the composition of the present invention is such that upon gas chromatographic measurement under the foregoing analysis conditions, the concentration of trans-isomers of an EPA alkyl ester can be 0.01 area % or more, for example, 0.02 area % or more, 0.03 area % or more, 0.04 area % or more, or 0.05 area % or more.

In preferred embodiments, the composition of the present invention is such that upon gas chromatographic measurement under the foregoing analysis conditions, the concentration of trans-isomers of EPA ethyl ester can be 2.5 area % or less, for example, 2.3 area % or less, 2.0 area % or less, 1.8 area % or less, 1.6 area % or less, 1.4 area % or less, 1.2 area % or less, 1.0 area % or less, 0.9 area % or less, 0.8 area % or less, 0.7 area % or less, 0.6 area % or less, or 0.5 area % or less. On the other hand, the composition of the present invention is such that upon gas chromatographic measurement under the foregoing analysis conditions, the concentration of trans-isomers of EPA ethyl ester can be 0.01 area % or more, for example, 0.02 area % or more, 0.03 area % or more, 0.04 area % or more, or 0.05 area % or more.

The composition of the present invention may be such that upon gas chromatographic measurement under the foregoing analysis conditions, the concentration of trans-isomers of a DGLA alkyl ester can be 2.5 area % or less, for example, 2.3 area % or less, 2.0 area % or less, 1.8 area % or less, 1.6 area % or less, 1.4 area % or less, 1.2 area % or less, 1.0 area % or less, 0.9 area % or less, 0.8 area % or less, 0.7 area % or less, 0.6 area % or less, or 0.5 area % or less. On the other hand, the composition of the present invention is such that upon gas chromatographic measurement under the foregoing analysis conditions, the concentration of trans-isomers of a DGLA alkyl ester can be 0.01 area % or more, for example, 0.02 area % or more, 0.03 area % or more, 0.04 area % or more, or 0.05 area % or more.

In preferred embodiments, the composition of the present invention is such that upon gas chromatographic measurement under the foregoing analysis conditions, the concentration of trans-isomers of DGLA ethyl ester can be 2.5 area % or less, for example, 2.3 area % or less, 2.0 area % or less, 1.8 area % or less, 1.6 area % or less, 1.4 area % or less, 1.2 area % or less, 1.0 area % or less, 0.9 area % or less, 0.8 area % or less, 0.7 area % or less, 0.6 area % or less, or 0.5 area % or less. On the other hand, the composition of the present invention is such that upon gas chromatographic measurement under the foregoing analysis conditions, the concentration of trans-isomers of DGLA ethyl ester can be 0.01 area % or more, for example, 0.02 area % or more, 0.03 area % or more, 0.04 area % or more, or 0.05 area % or more.

Fish oils and microorganism oils that contain highly unsaturated fatty acids also contain cholesterols in addition to triglycerides. Highly unsaturated fatty acid enriched oils prepared from these feed oils also contain cholesterols (WO 2012/118173). What is more, cholesterol-containing oils are not completely freed of cholesterols even if they are subjected to alkali esterification or urea adduct formation. Hence, in certain embodiments herein, the composition of the present invention contains cholesterols. The content of cholesterols can, for example, be 1.5 wt % or less, 0.3 wt % or less, or 0.2 wt % or less. In this connection, the content of cholesterols can, for example, be 0.01 wt % or more, or 0.02 wt % or more.

Cholesterols are compounds having a steroid skeleton represented by the molecular formula $C_{27}H_{46}O$, and in natural products, cholesterols are present in either a free or an ester form. The ester form is an acyl cholesterol having a fatty acid bound to the moiety of a hydroxyl group (OH group). In the context of the present invention, the cholesterol content means the sum of the contents of cholesterols in a free form and an ester form. The cholesterol content is measured by the following method.

To about 0.1 g of a sample, 1 mL of 0.1 g/L 5α-cholestane is added as an internal standard and after adding 1 mL of 20 mol/L potassium hydroxide in hydrous ethanol, the mixture is heated at 100° C. for 10 minutes. After cooling, 3 mL of petroleum ether and 3 mL of saturated ammonium sulfate are added and the mixture is stirred and allowed to settle undisturbed; subsequently, the upper layer is recovered and subjected to a gas chromatographic measurement under the following conditions. To determine the relative sensitivities for 5α-cholestane and free cholesterols, a hexane solution having each of 5α-cholestane and cholesterols dissolved in an amount of 25 mg is subjected to a gas chromatographic measurement and the total amount of cholesterols is calculated.

Gas Chromatographic Analysis Conditions
Apparatus model: Agilent 6890 GC system (Agilent)
Column: DB-1 J&W 123-1012
Column temperature: 270° C.
Injection temperature: 300° C.
Injection method: Split
Split ratio: 50:1
Detector temperature: 300° C.
Detector: FID
Carrier gas: helium (39.3 kPa, constant pressure)

In one embodiment, the composition of the present invention can contain as an impurity saturated fatty acids with a carbon number of not more than 18 or alkyl esters thereof. In this case, the proportion of saturated fatty acids with a carbon number of not more than 18 in the constituent fatty acids of the composition of the present invention can be 0.1 area % or more, for example, 0.2 area % or more or 0.3 area % or more, and less than 10 area %, for example, less than 5 area %, less than 4 area %, or less than 3 area %.

Highly unsaturated fatty acids can be obtained by hydrolyzing the highly unsaturated fatty acid alkyl esters produced by the above-described method.

The composition of the present invention is one that contains fatty acids or fatty acid alkyl esters as a major component and typically it contains 50% by weight or more, 55% by weight or more, 60% by weight or more, 65% by weight or more, 70% by weight or more, 75% by weight or more, 80% by weight or more, 85% by weight or more, 90% by weight or more, 95% by weight or more, 96% by weight or more, 97% by weight or more, 98% by weight or more, 99% by weight or more, 99.5% by weight or more, or 99.9% by weight or more of fatty acids or fatty acid alkyl esters. The content of the fatty acids or fatty acid alkyl esters in the composition of the present invention can be confirmed by a publicly known technique, such as TLC/FID.

<Method for Producing a Composition Containing a Highly Unsaturated Fatty Acid or an Alkyl Ester Thereof>

The present invention provides a method for producing the above-described composition of the present invention. The method comprises:
(1) alkyl esterifying a raw material containing a triglyceride comprising a highly unsaturated fatty acid as constituent fatty acid to prepare a composition containing a highly unsaturated fatty acid alkyl ester;
(2) at least one selected from among (a) reducing to less than 10,000 ppm the concentration of monoacyl glycerol that comprises as constituent fatty acid a fatty acid which has 5 or more carbon atoms fewer than the highly unsaturated fatty acid that constitutes the highly unsaturated fatty acid alkyl ester to be enriched in the composition prepared in step (1), (b) reducing the iron concentration in the composition prepared in step (1) to less than 0.20 ppm, and (c) reducing the chlorine concentration in the composition prepared in step (1) to less than 10 ppm; and
(3) distilling the composition resulting from step (2) and collecting the main distillate fraction (the method is hereinafter sometimes referred to as the method of the present invention).

According to the method of the present invention, a composition that contains fatty acids or fatty acid alkyl esters as a major component and contains 95% by weight or more, 96% by weight or more, 97% by weight or more, 98% by weight or more, 99% by weight or more, 99.5% by weight or more, or 99.9% by weight or more of fatty acids or fatty acid alkyl esters can be produced.

Hereinafter, step (1) is sometimes referred to as an alkyl esterification step, step (2)(a) is sometimes referred to as a monoacyl glycerol removing step, step (2)(b) is sometimes referred to as an iron removing step, step (2)(c) is sometimes referred to as a chlorine removing step, and step (3) is sometimes referred to as a distillation step.

Raw materials that can be used in the method of the present invention include the oils listed for the above-described composition of the present invention and they may specifically be exemplified by: fish oils such as sardine oil, tuna oil, bonito oil, menhaden oil, cod liver oil, herring oil, capelin oil, and salmon oil; marine animal oils derived from crustaceans such as krill; vegetable oils as derived from *perilla*, flax, soybean, and rapeseed; and oils derived from lipid-producing microorganisms including yeasts such as the genus *Yarrowia*, filamentous fungi belonging, for example, to the genus *Mortierella*, the genus *Penicillium*, the genus *Aspergillus*, the genus *Rhodotorula*, and the genus *Fusarium*, algae such as the genus *Euglena*, and stramenopiles. The oils that can be used as raw materials for the method of the present invention may be an oil derived from genetically engineered microorganisms transfected with a gene such as a genetically modified variant A9 elongase gene. Alternatively, oils derived from genetically engineered plants, namely, oilseed plants such as species of the genus *Brassica*, sunflower, corn, cotton, flax, and safflower that have been transfected with a gene such as a variant A9 elongase gene by gene recombinant technology can also be used as raw materials for the method of the present invention. Genetically engineered vegetable oils, genetically engineered microorganism oils and so forth can, for example, be illustrated by those which are disclosed in WO 2012/027698, WO 2010/033753, etc. In preferred embodiments, the raw materials used in the method of the present invention are fish oils, microorganism oils, vegetable oils or aquatic animal oils such as marine animal oils, more preferably fish oils.

Crude Oil Refining Step

The feed oil to be used for alkyl esterification in step (1) may be a crude oil or a refined oil. Crude oils may be obtained by any method from aquatic products such as fish or marine products, and in the case of fish oils, they are usually harvested in the following way: fish as a whole or residues that result from fish processing such as the head, skin, backbone or viscera of fish are milled, steamed and pressed to be separated into stick water and pressed meal. The fat and oil as obtained together with the stick water are centrifuged to be separated as crude fish oil.

Refined fish oils are generally obtained from crude fish oils via a refining process in which a degumming step, a deacidifying step, a decoloring step using activated clay or activated charcoal, a water washing step, a deodorizing step as by steam distillation, and other steps are performed depending on the raw material from which the crude fish oils have been prepared, to thereby remove off-target substances such as phospholipids and sterols. In embodiments of the present invention, refined fish oils can be used as the raw material.

Step (1) (Alkyl Esterification Step)

Fats or oils as the feed oil are decomposed into lower alcohol esters by means of alcoholysis using lower alcohols. Lower alcohols include those which are commonly used in the alkyl esterification of fatty acids, for example, lower alcohols having one or two carbon atoms. Alcoholysis is a technique by which a fat or oil is reacted with a lower alcohol such as ethanol in the presence of an added catalyst or enzyme so as to form an alkyl ester from a fatty acid bound to glycerin. Catalysts that may be used include an alkali catalyst, an acid catalyst, and so forth. Enzymes that may be used include lipase.

The alcoholysis of fatty acids has been empirically found to feature high reaction efficiency, and after alcoholysis, there are obtained compositions that mainly comprise fatty acids in the form of their alkyl esters. This, however, does not totally exclude the case of comprising fatty acids in other forms than alkyl esters.

Step (2)

Step (2) is a preliminary step before distillation and it is at least one step selected from the following (a) to (c). Briefly, step (2) can be any one of (a) to (c), or it may consist of (a) and (b), (a) and (c), (b) and (c), or (a), (b) and (c).

(a) Monoacyl Glycerol Removing Step

In step (2)(a), before the composition prepared in step (1) that contains fatty acid alkyl esters is concentrated by distillation, the content of monoacyl glycerols that serve as the substrate for fatty acid esters of 3-MCPD is reduced. As a result, the amount of fatty acid esters of 3-MCPD that result from heat treatments during distillation to become included in the main distillate fraction can be reduced.

To remove monoacyl glycerols from the composition prepared in step (1) that contains fatty acid alkyl esters, one may employ existing techniques such as repeated treatments of alkyl esterification or treatments with adsorbents.

Esterification is an equilibrium reaction and the residual amount of glycerides depends on the ratio between alcohol and the by-product glycerin. If the ester fractions obtained as the result of alkyl esterification are again subjected to alkyl esterification, the ratio between alcohol and glycerin is shifted significantly more to the alcohol side than to the glycerin side, whereby the content of glycerides can be reduced.

Treatments with adsorbents may, for example, include silica gel chromatography, treatment with activated clay, treatment with acidic clay, treatment with activated charcoal, and treatment with silica gel. Silica gel chromatography may, for example, be performed by the following procedure. In the treatment with silica gel (e.g. Microsphere D75-60A), a composition containing fatty acid alkyl esters is applied to a column packed with silica gel so that the fatty acid alkyl esters are adsorbed on the silica gel. Subsequently, ethyl acetate/hexane (1:50) is passed through the column, the eluate is fractionated, and fractions consisting of MAG- and DAG-free fatty acid alkyl esters are recovered. The solvent is removed from the recovered fractions to obtain fatty acid alkyl esters. Treatment with activated clay may, for example, be carried out by adding activated clay in an amount of 5% relative to the oil, stirring the mixture at 120° C. for 2 hours under reduced pressure, and then filtering the mixture. Other treatments with adsorbents can be performed by routine methods.

The monoacyl glycerol to be removed in step (2)(a) is comprises as the constituent fatty acid a fatty acid that has 5 or more carbon atoms fewer than the highly unsaturated fatty acid that constitutes the highly unsaturated fatty acid alkyl ester to be enriched. Here, the highly unsaturated fatty acid alkyl ester to be enriched refers to that highly unsaturated fatty acid alkyl ester which is intended to be enriched in the method of the present invention. To be more specific, in the distillation of step (3), conditions are set in such a way that the highly unsaturated fatty acid alkyl ester to be enriched will be collected as the main distillate fraction. Hence, the highly unsaturated fatty acid alkyl ester to be enriched is the highly unsaturated fatty acid alkyl ester that is collected as the main distillate fraction, and enriched therein, in the distillation of step (3).

In the case where two or more highly unsaturated fatty acid alkyl esters are to be enriched (for example, combinations of alkyl esters of two or more highly unsaturated fatty acids selected from among eicosapentaenoic acid, docosahexaenoic acid, dihomo-γ-linolenic acid, and arachidonic acid are to be enriched), the concentrations of monoacyl glycerols which comprise as the constituent fatty acids those fatty acids which have 5 or more carbon atoms fewer than the highly unsaturated fatty acid that has the highest carbon number are reduced.

While the constituent fatty acid of monoacyl glycerol to be removed in step (2)(a) may be either saturated or unsaturated fatty acid, removal of monoacyl glycerol of saturated fatty acid is preferred.

In step (2)(a), the concentration of monoacyl glycerol which comprises as the constituent fatty acid a fatty acid which has 5 or more carbon atoms fewer than the highly unsaturated fatty acid that constitutes the highly unsaturated fatty acid alkyl ester to be enriched is reduced to less than 10,000 ppm, less than 9,000 ppm, less than 8,000 ppm, less than 7,000 ppm, less than 6,000 ppm, less than 5,000 ppm, less than 4,000 ppm, less than 3,000 ppm, less than 2,000 ppm, less than 1,000 ppm, less than 900 ppm, less than 800 ppm, less than 700 ppm, less than 600 ppm, or less than 500 ppm. In some embodiments, the concentration of monoacyl glycerol is greater than zero ppm. In some embodiments, before said reduction, the concentration of said monoacyl glycerol is 10,000 ppm or more or the other mentioned upper limit or higher. For example, in the case where the highly unsaturated alkyl ester to be enriched is an alkyl ester of eicosapentaenoic acid (20:5 n-3), dihomo-γ-linolenic acid (20:3 n-6), or arachidonic acid (20:4 n-6) or combinations thereof, the concentration of monoacyl glycerols comprising as the constituent fatty acid a fatty acid having no more than 15 carbon atoms, preferably a fatty acid having 14 carbon atoms, is reduced to any one of the values listed above. If the highly unsaturated alkyl ester to be enriched is an alkyl ester of docosahexaenoic acid (22:6 n-3), the concentration of monoacyl glycerols comprising as the constituent fatty acid a fatty acid having no more than 17 carbon atoms, preferably a fatty acid having 16 carbon atoms, is reduced to any one of the values listed above. And, if the highly unsaturated alkyl ester to be enriched is a combination of an alkyl ester of docosahexaenoic acid (22:6 n-3) with at least one member selected from among alkyl esters of eicosapentaenoic acid (20:5 n-3), dihomo-γ-linolenic acid (20:3 n-6) and arachidonic acid (20:4 n-6), the concentration of monoacyl glycerols comprising as the constituent fatty acid a fatty acid having no more than 17 carbon atoms, preferably a fatty acid having 14 carbon atoms and a fatty acid having 16 carbon atoms, is reduced to any one of the values listed above.

In the distillation of step (3) a fatty acid ester of 3-MCPD, that can be generated from a monoacyl glycerol which comprises as the constituent fatty acid a fatty acid that has 5 or more carbon atoms fewer than the highly unsaturated fatty acid that constitutes the highly unsaturated fatty acid alkyl ester to be enriched, can be contained in the main distillate fraction together with said highly unsaturated fatty acid alkyl ester. Hence, if, in the case where the highly unsaturated fatty acid alkyl ester to be enriched in the distillation of step (3) is to be obtained as the main distillate, the concentration of monoacyl glycerol which comprises as the constituent fatty acid a fatty acid that has 5 or more carbon atoms fewer than the highly unsaturated fatty acid that constitutes the highly unsaturated fatty acid alkyl ester to be enriched is preliminarily reduced, one can obtain a composition containing a highly unsaturated fatty acid alkyl ester having a reduced concentration of a fatty acid ester of 3-MCPD.

The monoacyl glycerols to be removed in step (2)(a) may be those which comprise as the constituent fatty acids those fatty acids which have 5 to 10, 5 to 9, 5 to 8, 5 to 7, 5 to 6, or 6 carbon atoms fewer than the highly unsaturated fatty acid that constitutes the highly unsaturated fatty acid alkyl ester to be enriched. In step (2)(a), the concentration of these classes of monoacyl glycerols collectively may be reduced to one of the values listed above.

In some preferred embodiments, the highly unsaturated fatty acid alkyl ester to be enriched is eicosapentaenoic acid (20:5 n-3) alkyl ester, dihomo-γ-linolenic acid (20:3 n-6) alkyl ester, or arachidonic acid (20:4 n-6) alkyl ester, or combinations thereof, and the monoacyl glycerol to be removed in step (2)(a) can be glycerol monomyristate.

In some preferred embodiments, the highly unsaturated fatty acid alkyl ester to be enriched is a docosahexaenoic acid (22:6 n-3) alkyl ester, and the monoacyl glycerol to be removed in step (2)(a) can be glycerol monopalmitate.

In some preferred embodiments, the highly unsaturated fatty acid alkyl ester to be enriched is a combination of docosahexaenoic acid (22:6 n-3) alkyl ester with at least one member selected from among eicosapentaenoic acid (20:5 n-3) alkyl ester, dihomo-γ-linolenic acid (20:3 n-6) alkyl ester, and arachidonic acid (20:4 n-6) alkyl ester, and the monoacyl glycerols to be removed in step (2)(a) can consist of glycerol monomyristate and glycerol monopalmitate.

As herein referred to, the concentrations of monoacyl glycerol (MAG) and diacyl glycerol (DAG) in the composition are values (ppm (mg/kg)) as calculated from the values of measurement by the following method.

A hundred microliters of the composition is sampled, accurately weighed, and dissolved in 400 µL of hexane to prepare 150 µL of a solution, which is then subjected to thin-layer chromatography (TLC) under the following conditions to thereby separate MAG and DAG. All bands of MAG and DAG so identified at UV 254 nm are scraped off and after adding 1 mL of 1 N sodium methoxide in methanol, the mixture is heated for 5 minutes under thorough stirring. Subsequently, the mixture is cooled to room temperature and after adding 1 mL of 1 N HCl, the mixture is stirred thoroughly. After adding 1 mL of 0.1 mg/mL C23:0 FAME (tricosanoic acid methyl ester) in hexane and 5 mL of saturated brine, the mixture is stirred thoroughly. Using the resulting hexane layer as a sample, GC-FID analysis is performed under the following conditions and the concentrations of respective fatty acids are calculated by the following formula:

Concentration of a fatty acid [mg/kg]=(peak area for the fatty acid/peak area for C23:0)×($10^5$/the amount [mg] of the sample subjected to TLC)

TLC Conditions
TLC plate: PLC Silica gel $60F_{254}$ 0.5 mm, 10 cm×10 cm
Developing solvents: hexane/diethyl ether/acetic acid (7:3: 0.1, vol/vol/vol)

GC-FID measurement conditions
GC: 6890N (Agilent Technologies)
Column: DB-WAX (Agilent Technologies)
30 m×0.25 mm ID, 0.25 µm film thickness
Carrier gas: helium, 1 mL/min
Injection port: 250° C., 1 µL, Split (1:100)
Column temperature: 180° C.=>3° C./min=>230° C., retained for 15 min
Detector: FID, 250° C.
Makeup gas: nitrogen, 45 mL/min.

(b) Iron Removing Step

In step (2)(b), the iron concentration is reduced to less than 0.20 ppm, less than 0.10 ppm, less than 0.09 ppm, less than 0.08 ppm, less than 0.07 ppm, less than 0.06 ppm, or less than 0.05 ppm. In some embodiments, the concentration of iron is greater than zero ppm. In some embodiments, before said reduction, the concentration of iron is 0.20 ppm or more or the other mentioned upper limit or higher. By reducing the iron concentration, the formation of fatty acid esters of 3-MCPD can be suppressed.

As herein referred to, the iron concentration (or iron content) is a value (ppm (mg/kg)) that is calculated from measurements by ICP-MS. Specifically, it is calculated by the following procedure.

After precisely weighing 1 g of a test composition, add butyl acetate (of a grade for atomic absorption analysis; manufactured by Wako Pure Chemical Industries, Ltd.) to make 10 mL; the resulting solution is used as a sample fluid.

As a standard sample, Conostan S-21 (10 ppm (Wt.)) is used. This standard sample is diluted with butyl acetate to prepare samples for the construction of a calibration curve (0 µg/L, 0.1 µg/L, 0.5 µg/L, 1 µg/L, 5 µg/L, 10 µg/L, 50 µg/L, and 100 µg/L).

The sample fluid and the samples for calibration curve are subjected to ICP-MS analysis under the following conditions; a calibration curve is constructed by automatic calculations with the software which is an accessory to the apparatus and the iron content in the sample fluid is determined.

Instrument: Agilent 7700 series ICP-MS (Agilent Technologies)
RF power: 1550 W
Sampling position: 10 mm
Carrier gas: 0.45 L/min
Option gas: 20%
Makeup gas: 0.20 L/min
Spray chamber temperature: −5° C.
Sample introduction: suction under negative pressure
Measuring mode: He mode
He cell gas flow rate: 4.3 mL/min
Element to be measured: $^{56}Fe$ Given the thus determined iron content in the sample fluid, the iron content in the sample composition is calculated by the following formula:

Iron content [ppm] in the sample composition=$C/(W \times 100)$

C: the iron content (µg/L) in the sample fluid as measured by ICP-MS
W: the amount of the sample composition collected (g)

The iron concentration may be reduced to less than 0.20 ppm, less than 0.10 ppm, less than 0.09 ppm, less than 0.08 ppm, less than 0.07 ppm, less than 0.06 ppm, or less than 0.05 ppm by a step different from the monoacyl glycerol removing step. In some embodiments, the concentration of iron is greater than zero ppm. Techniques for reducing the iron concentration may be those which can be employed in the above-descried monoacyl glycerol removing step; other examples include acid cleaning and ion exchange. These removal techniques can be performed by routine methods.

(c) Chlorine Removing Step

In step (2)(c), the chlorine concentration is reduced to less than 10 ppm, for example, less than 9 ppm, less than 8 ppm, or less than 7 ppm. In some embodiments, the concentration of chlorine is greater than zero ppm. In some embodiments, before said reduction, the concentration of chlorine is 10 ppm or more or the other mentioned upper limit or higher. By reducing the chlorine concentration, the formation of fatty acid esters of 3-MCPD can be suppressed.

As herein referred to, the chlorine concentration (or chlorine content) is a value (ppm (mg/kg)) as calculated from measurements by ICP-MS. Specifically, it is calculated by the following procedure.

After precisely weighing 1 g of a test composition, add butyl acetate (of a grade for atomic absorption analysis; manufactured by Wako Pure Chemical Industries, Ltd.) to make 10 mL; the resulting solution is used as a sample fluid.

As a standard sample, Conostan Cl Std. (1000 ppm (Wt.)) is used. This standard sample is diluted with butyl acetate to prepare samples for the construction of a calibration curve (0 μg/L, 0.1 μg/L, 0.5 μg/L, 1 μg/L, 5 μg/L, 10 μg/L, 50 μg/L, and 100 μg/L).

The sample fluid and the samples for calibration curve are subjected to ICP-MS analysis under the following conditions; a calibration curve is constructed by automatic calculations with the software which is an accessory to the apparatus, and the chlorine content in the sample fluid is determined.

Instrument: Agilent 7700 series ICP-MS (Agilent Technologies)
RF power: 1550 W
Sampling position: 10 mm
Carrier gas: 0.45 L/min
Option gas: 20%
Makeup gas: 0.20 L/min
Spray chamber temperature: −5° C.
Sample introduction: suction under negative pressure
Measuring mode: He mode
He cell gas flow rate: 4.3 mL/min
Element to be measured: $^{35}Cl$ Given the thus determined chlorine content in the sample fluid, the chlorine content in the sample composition is calculated by the following formula:

Chlorine content [ppm] in the sample composition=$C/(W \times 100)$

C: the chlorine content (μg/L) in the sample fluid as measured by ICP-MS
W: the amount of the sample composition collected (g)

The chlorine concentration may be reduced to less than 10 ppm, for example, less than 9 ppm, less than 8 ppm, or less than 7 ppm by a step different from the monoacyl glycerol removing step. In some embodiments, the concentration of chlorine is greater than zero ppm. Techniques for reducing the chlorine concentration may be those which can be employed in the above-described monoacyl glycerol removing step; other examples include degumming, deacidification and other techniques that are commonly employed in the process of refining fats and oils. These removal techniques can be performed by routine methods.

Step (3) (Distillation Step)

The composition that has been reduced in the concentration of monoacyl glycerols in step (2) is distilled and the main distillate fraction is collected. By setting such conditions that the main distillate fraction comprises the highly unsaturated fatty acid alkyl esters to be enriched, one can obtain a composition that contains the highly unsaturated fatty acid alkyl esters and in which the concentration of 3-MCPD as found upon analyzing the composition by American Oil Chemists' Society official method Cd 29b-13 assay A is less than 1.80 ppm, even if fatty acid esters of 3-MCPD result from the heat treatment during distillation. Such distillation conditions can be set as appropriate for the highly unsaturated fatty acid alkyl esters to be enriched.

The distillation step can be performed by, for example, rectification (precision distillation), molecular distillation or short-path distillation. These operations can be performed by routine methods, such as those disclosed in JP H4-128250 A, JP H5-222392 A, JP H4-41457 A, and JP H6-33088 A.

Rectification is performed under high vacuum and highly unsaturated fatty acid alkyl esters can be obtained as the main distillate by separating it from a more volatile initial distillate and a less volatile residue. The conditions for rectification may be so set that the highly unsaturated fatty acid alkyl esters to be enriched can be enriched as the main distillate and may be illustrated by a temperature between 150° C. and 200° C., for example, between 160° C. and 200° C., or between 170° C. and 200° C., and a pressure between 1 and 300 Pa, for example, between 1 and 200 Pa, between 1 and 100 Pa, or between 1 and 50 Pa. It is preferred to obtain the main distillate at between 170° C. and 200° C. with a degree of vacuum lying between 1 and 50 Pa.

Exemplary conditions for molecular distillation or short-path distillation include a temperature between 80° C. and 150° C., for example, between 80° C. and 130° C., or between 80° C. and 120° C., and a pressure of less than $10 \times 10^{-1}$ Pa, for example, less than $10 \times 10^{-2}$ Pa or less than $10 \times 10^{-3}$ Pa.

The concentration of 3-MCPD as found upon analyzing the main distillate fraction from step (3) by American Oil Chemists' Society official method Cd 29b-13 assay A is less than 1.80 ppm, for example, less than 1.70 ppm, less than 1.60 ppm, less than 1.50 ppm, less than 1.40 ppm, less than 1.30 ppm, less than 1.20 ppm, less than 1.10 ppm, less than 1.00 ppm, less than 0.90 ppm, less than 0.80 ppm, less than 0.70 ppm, less than 0.60 ppm, less than 0.50 ppm, less than 0.40 ppm, less than 0.30 ppm, less than 0.20 ppm, less than 0.10 ppm, less than 0.09 ppm, less than 0.08 ppm, less than 0.07 ppm, less than 0.06 ppm, less than 0.05 ppm, less than 0.04 ppm, less than 0.03 ppm, less than 0.02 ppm, or less than 0.01 ppm. In some embodiments, the concentration of 3-MCPD is greater than zero ppm. In particular the concentration of 3-MCPD as found upon analyzing the main distillate fraction from step (3) by American Oil Chemists' Society official method Cd 29b-13 assay A may be 0.01 ppm or more, for example, 0.02 ppm or more. What is more, the concentration of 3-MCPD as found upon analyzing the main distillate fraction from step (3) by American Oil Chemists' Society official method Cd 29b-13 assay A may be 0.01 ppm or more, and less than 1.80 ppm, less than 1.70 ppm, less than 1.60 ppm, less than 1.50 ppm, less than 1.40 ppm, less than 1.30 ppm, less than 1.20 ppm, less than 1.10 ppm, less than 1.00 ppm, less than 0.90 ppm, less than 0.80 ppm, less than 0.70 ppm, less than 0.60 ppm, less than 0.50 ppm, less than 0.40 ppm, less than 0.30 ppm, less than 0.20 ppm, less than 0.10 ppm, less than 0.09 ppm, less than 0.08 ppm, less than 0.07 ppm, less than 0.06 ppm, less than 0.05 ppm, less than 0.04 ppm, less than 0.03 ppm, less than 0.02 ppm. The concentration of 3-MCPD as found upon analyzing the main distillate fraction from step (3) by American Oil Chemists' Society official method Cd 29b-13 assay A may be 0.02 ppm or more, and less than 1.80 ppm, less than 1.70 ppm, less than 1.60 ppm, less than 1.50 ppm, less than 1.40 ppm, less than 1.30 ppm, less than 1.20 ppm, less than 1.10 ppm, less than 1.00 ppm, less than 0.90 ppm, less than 0.80 ppm, less than 0.70 ppm, less than 0.60 ppm, less than 0.50 ppm, less than 0.40 ppm, less than 0.30 ppm, less than 0.20 ppm, less than 0.10 ppm, less than 0.09 ppm, less than 0.08 ppm, less than 0.07 ppm, less than 0.06 ppm, less than 0.05 ppm, less than 0.04 ppm, or less than 0.03 ppm.

Chromatographic Step

The method of the present invention may further comprise a refining step after step (3) that is based on chromatography such as high-performance liquid column chromatography (HPLC).

The chromatographic step based on HPLC or otherwise, which is subsequent to the distillation step, is such that the contents of off-target components in the composition that results from the distillation step are reduced by, for example, removing the off-target components, whereupon the highly unsaturated fatty acid alkyl ester is further enriched in the post-distillation composition. The chromatographic step can be performed in accordance with conventionally known methods, for example, the method disclosed in JP H5-222392 A. Chromatography for use in the enrichment process may be exemplified by reversed-phase column chromatography. Examples of the stationary phase (adsorbent) include polymer beads, preferably polystyrene reticulated with DVB (divinylbenzene), and silica gel, preferably reversed-phase bound silica gel comprising C8 or C18 alkane, and C18 bound reversed-phase silica gel is particularly preferred. The adsorbent to be used in chromatography that follows distillation in the present invention is preferably non-polar. Any adsorbents for reversed-phase partition may be used without particular limitations and an example is an octadecylsilyl (ODS) silica gel that may be used to make an ODS column.

The size of the columns to be used in the apparatus is not particularly limited, except that it depends on the amount of the sample to be purified. Any skilled artisan can easily determine the column of appropriate size to be used. The diameter of each column is typically between 10 and 800 mm, preferably between 50 and 800 mm, more preferably between 300 and 800 mm, and most preferably between 600 and 800 mm. The length of each column is typically between 10 and 200 mm, preferably between 25 and 150 mm.

The temperature of the mobile phase and column is not particularly limited, except that it depends on the degree by which the material to be separated will dissolve in the mobile phase. Any skilled artisan can easily determine the temperature of the appropriate mobile phase and column to be used. The column temperature is typically between 0° C. and 70° C., preferably between 20° C. and 40° C.

The solvent to be used in the mobile phase may, for example, be exemplified by short-chain alcohols. Short-chain alcohols typically have 1 to 6 carbon atoms. Examples of suitable short-chain alcohols include methanol, ethanol, n-propanol, propanol, n-butanol, i-butanol, s-butanol and t-butanol. The solvent to be used in the mobile phase is preferably methanol or ethanol, more preferably methanol. To shorten the elution time, it is preferred that no water is intentionally added to the short-chain alcohols.

<Distillation Feed Composition>

The present invention also provides a distillation feed composition for obtaining the above-described composition of the present invention, and the use of such a distillation feed composition as distillation feed in a method for producing the above-described composition of the present invention. The distillation feed composition contains a highly unsaturated fatty acid alkyl ester and is reduced in the content of monoacyl glycerol or reduced in the iron concentration. The highly unsaturated fatty acid alkyl ester comprises a highly unsaturated fatty acid alkyl ester to be enriched. By distilling the distillation feed composition to obtain a highly unsaturated fatty acid alkyl ester in a distilled fraction, it is possible to enrich the highly unsaturated fatty acid alkyl ester while reducing the content of a fatty acid ester of 3-MCPD.

To produce the distillation feed composition of the present invention, oils that have been listed as raw materials for the composition of the present invention may be alkyl esterified while reducing the content of monoacyl glycerol or reducing the iron concentration. In one embodiment, the distillation feed composition of the present invention is produced from or obtainable from a raw material such as a fish oil, a microorganism oil, a vegetable oil or a marine animal oil, such as by the method for producing the above-described composition of the present invention. In a preferred embodiment, the raw material for the distillation feed composition of the present invention is a fish oil. Alkyl esterification and reduction in the content of monoacyl glycerol or the iron concentration can be carried out by the methods described above in connection with the method of the present invention. In a preferred embodiment, the highly unsaturated fatty acid alkyl ester contained in the distillation feed composition of the present invention can be a highly unsaturated fatty acid ethyl ester. In this connection, the highly unsaturated fatty acid alkyl ester to be enriched can be an alkyl ester of eicosapentaenoic acid, docosahexaenoic acid, dihomo-γ-linolenic acid or arachidonic acid, or combinations thereof. In preferred embodiments, the highly unsaturated fatty acid alkyl ester to be enriched can be an alkyl ester of eicosapentaenoic acid or docosahexaenoic acid, or a combination thereof. In a more preferred embodiment, the highly unsaturated fatty acid alkyl ester to be enriched can be an eicosapentaenoic acid alkyl ester.

The distillation feed composition of the present invention is a composition that contains a fatty acid alkyl ester as a major component and it contains 95% by weight or more, 96% by weight or more, 97% by weight or more, 98% by weight or more, 99% by weight or more, or 99.5% by weight or more, of the fatty acid alkyl ester.

The proportion of highly unsaturated fatty acid relative to all the fatty acids in the distillation feed composition of the present invention is 5 area % or more, for example, 10 area % or more, 15 area % or more, or 20 area % or more. On the other hand, the proportion of highly unsaturated fatty acid relative to all the fatty acids in the distillation feed composition of the present invention is less than 70 area % or more, for example, less than 65 area % or more, 60 area % or more, or 55 area % or more.

The distillation feed composition of the present invention may contain a saturated fatty acid with a carbon number of not more than 18 or an alkyl ester thereof as an impurity. In this case, the proportion of the saturated fatty acid with a carbon number of not more than 18 in the constituent fatty acids of the distillation feed composition of the present invention may be 0.1 area % or more, for example, 0.2 area % or more, 0.3 area % or more, 0.4 area % or more, or 0.5 area % or more, and less than 50 area %, for example, less than 40 area %, or less than 30 area %.

In preferred embodiments, with respect to monoacyl glycerols that comprise as the constituent fatty acid a fatty acid that has 5 or more carbon atoms fewer than the highly unsaturated fatty acid that constitutes the highly unsaturated fatty acid alkyl ester to be enriched, the concentration of such monoacyl glycerol in the distillation feed composition of the present invention is less than 10,000 ppm, less than 9,000 ppm, less than 8,000 ppm, less than 7,000 ppm, less than 6,000 ppm, less than 5,000 ppm, less than 4,000 ppm, less than 3,000 ppm, less than 2,000 ppm, less than 1,000 ppm, less than 900 ppm, less than 800 ppm, less than 700 ppm, less than 600 ppm, or less than 500 ppm. In some embodiments, the concentration of such monoacyl glycerol is greater than zero ppm.

The class of monoacyl glycerols to which the above-described upper limits apply may be those that comprise as the constituent fatty acid a fatty acid which has 5 to 10, 5 to 9, 5 to 8, 5 to 7, 5 to 6, or 6 carbon atoms fewer than the highly unsaturated fatty acid that constitutes the highly unsaturated fatty acid alkyl ester to be enriched.

In preferred embodiments, the highly unsaturated fatty acid alkyl ester to be enriched is eicosapentaenoic acid (20:5 n-3) alkyl ester, dihomo-γ-linolenic acid (20:3 n-6) alkyl ester, or arachidonic acid (20:4 n-6) alkyl ester, or combinations thereof, and the monoacyl glycerol can be glycerol monomyristate.

In preferred embodiments, the highly unsaturated fatty acid alkyl ester to be enriched is docosahexaenoic acid (22:6 n-3) alkyl ester, and the monoacyl glycerol can be glycerol monopalmitate.

In preferred embodiments, the highly unsaturated fatty acid alkyl ester to be enriched is a combination of docosahexaenoic acid (22:6 n-3) alkyl ester with at least one member selected from among eicosapentaenoic acid (20:5 n-3) alkyl ester, dihomo-γ-linolenic acid (20:3 n-6) alkyl ester, and arachidonic acid (20:4 n-6) alkyl ester, and the monoacyl glycerol can consist of glycerol monomyristate and glycerol monopalmitate.

In preferred embodiments, the iron concentration in the distillation feed composition of the present invention is less than 0.20 ppm, less than 0.10 ppm, less than 0.09 ppm, less than 0.08 ppm, less than 0.07 ppm, less than 0.06 ppm, or less than 0.05 ppm. In some embodiments, the concentration of iron is greater than zero ppm.

In preferred embodiment, the chlorine concentration in the distillation feed composition of the present invention is less than 10 ppm, for example, less than 9 ppm, less than 8 ppm, or less than 7 ppm. In some embodiments, the concentration of chlorine is greater than zero ppm.

<Mode of Utilization>

The mode in which the composition of the present invention is utilized is not particularly limited but it is preferably in an oral dosage form, typically, in the form of oral preparations such as granules, tablets, capsules, and liquids. Uses of the composition of the present invention include, for example, foods or drinks (e.g. health foods, nutraceutical products, foods for specified health use, supplements, dairy products, soft drinks, foods or drinks for companion animals, and feeds for livestock), pharmaceuticals, and quasi-drugs; supplements and pharmaceuticals are particularly preferred. Aside from food ingredients or food products, the composition of the present invention may be used as components to be added to animal feeds. Hence, the composition of the present invention can be used as ingredients or effective components for the foods or drinks, pharmaceuticals, and quasi-drugs mentioned above, so they can preferably be used in the manufacture of those foods or drinks, pharmaceuticals, and quasi-drugs.

Hereinafter, Examples of the present invention are described but it should be understood that they are by no means intended to limit the scope of the present invention.

In the following Examples, the designation of "%" means % by weight unless otherwise indicated; "ppm" means ppm by weight (i.e., mg/kg) unless otherwise indicated.

In the Examples, 3-MCPD concentration means a value of measurement by American Oil Chemists' Society (AOCS) official method Cd 29b-13 assay A. In addition, 3-MCPD concentration of 0.00 ppm means that 3-MCPD was not detected by said assay method (i.e., it was less than the value of detection limit).

In the Examples, iron concentration of 0.00 ppm means that iron was not detected in the measurement by the above-described ICP-MS (i.e., it was less than the value of detection limit).

EXAMPLES

[Test 1] Effects of Iron Content on the Formation of 3-MCPD

Sardine oil as a feed was deacidified by short-path distillation and the resulting oil was ethyl esterified in the presence of an alkali catalyst, followed by refining on silica gel and collection of an ethyl ester fraction. For the refining on silica gel, an open glass column packed with Microsphere gel D-75-60A (AGC Si-Tech Co., Ltd.) in 5 volumes of the sample was used, with hexane/ethyl acetate (50:1) being used as an eluent.

The ethyl ester fraction (fish oil ethyl ester (EE)) was subjected to thin-layer chromatography (TLC) that confirmed no detection of DAG and MAG bands.

Measurement of the iron concentration was also conducted but no iron was detected in the ethyl ester fraction.

To the fish oil EE, glycerol monomyristate (Wako Pure Chemical Industries, Ltd.; product code 321-32412) was added in an amount of 1000 ppm. What is more, an aqueous solution of iron(II) sulfate heptahydrate was added to give an iron content of 0.10 ppm (Example 2) or 1.00 ppm (Comparative Example 1); alternatively, it was not added at all (Example 1). Subsequently, ethanol was added to make a uniform solution. By subsequent evaporation and vacuum drawing, the solvent was thoroughly removed.

Each test section was stirred in a nitrogen stream under heating at 210° C. on an oil bath while it was sampled over time to measure the 3-MCPD concentration. The changes in the 3-MCPD concentration of each test section during heating are shown in Table 1.

TABLE 1

| | Iron content | | |
| --- | --- | --- | --- |
| Heating time | 0.00 PPM Example 1 | 0.10 PPM Example 2 | 1.00 PPM Comparative Example 1 |
| 0 hr | 0.00 PPM | 0.00 PPM | 0.00 PPM |
| 1 hr | 0.01 PPM | 0.04 PPM | 0.21 PPM |
| 2 hr | 0.05 PPM | 0.06 PPM | 0.63 PPM |
| 4 hr | 0.08 PPM | 0.15 PPM | 0.61 PPM |

In Comparative Example 1 where 1.00 ppm of iron was added, 0.61 ppm of 3-MCPD formed after heating for 4 hours. In contrast, Examples 1 and 2 where the iron concentration was adjusted to 0.00 ppm and 0.10 ppm, respectively, had 3-MCPD contents of 0.08 ppm and 0.15 ppm even after heating for 4 hours; those values were considerably lower than the 0.61 ppm of Comparative Example 1.

[Test 2] Effects of MAG Content on the Formation of 3-MCPD

Fish oil EE (with iron concentration adjusted to 10 ppm) was prepared as in Test 1 and it was heated in a nitrogen stream at 120° C. for an hour, either alone or with glycerol monomyristate (Wako Pure Chemical Industries, Ltd.; product code 321-32412) being added at concentrations of 1 to 10%.

The 3-MCPD concentrations after heating are shown in Table 2. Even at the relatively low temperature of 120° C. which is commonly adopted for distilling off ethyl esters of fatty acids by molecular distillation, the 3-MCPD concentration was found to increase with increasing MAG concentration.

TABLE 2

| Amount of MAG added | 3-MCPD |
| --- | --- |
| Not added | 0.00 PPM |
| 1% | 0.10 PPM |
| 2% | 0.18 PPM |
| 3% | 0.23 PPM |
| 5% | 0.36 PPM |
| 10% | 0.67 PPM |

[Test 3] Effects of MAG Content on the Formation of 3-MCPD in the Distillation Product of Fish Oil Ethyl Ester Fish oil containing 20 area % of EPA was ethyl esterified in the presence of an alkali catalyst in the usual manner to prepare fish oil ethyl ester 1. Fish oil ethyl ester 1 had the following characteristic data: the proportion of EPA in the makeup of fatty acids was 20 area %; DAG and MAG each comprising C14:0 as a constituent fatty acid were contained at the concentrations shown in Table 3; the iron concentration was 0.2 ppm; and the chlorine concentration was 17 ppm.

TABLE 3

| | DAG and MAG contents [mg/kg] in fish oil ethyl ester 1 | |
| --- | --- | --- |
| FA species | DAG fraction | MAG fraction |
| C12:0 | 0 | 8 |
| C14:0 | 201 | 501 |
| C15:0 | 26 | 30 |
| C16:0 | 575 | 1127 |
| C16:1n-7 | 215 | 541 |
| C16:2(9, 12) | 0 | 95 |
| C16:3(5, 9, 12 | 29 | 113 |
| C16:4n-1 | 77 | 232 |
| C18:0 | 137 | 232 |
| C18:1n-9 | 282 | 534 |
| C18:1n-7 | 94 | 216 |
| C18:2n-6 | 0 | 62 |
| C18:4n-3 | 53 | 161 |
| C20:4n-6 | 0 | 73 |
| C20: 5n-3 | 502 | 1447 |
| C22: 5n-3 | 0 | 161 |
| C22:6n-3 | 288 | 535 |
| Others | 112 | 216 |
| Total | 2591 | 6284 |

Then, there were prepared fish oil ethyl ester 2 as obtained by removing MAG and DAG from fish oil ethyl ester 1, fish oil ethyl ester 3 having glycerol monomyristate added to fish oil ethyl ester 2, and fish oil ethyl ester 4 having glycerol monopalmitate added to fish oil ethyl ester 2.

Fish oil ethyl ester 2 was prepared by the following method.

Six hundred grams of fish oil ethyl ester 1 was mixed with 2400 mL of hexane and the resulting liquid mixture was passed through a column packed with a slurry of silica gel (1200 g; Microsphere D75-60A) in hexane so that the fish oil ethyl ester was adsorbed on the silica gel. Subsequently, ethyl acetate/hexane (1:50) was passed through the column and the eluate was fractionated, followed by recovering a fraction consisting of the fish oil ethyl ester from which the MAG and DAG had been removed. From the recovered fraction, the solvent was removed by means of an evaporator and vacuum drawing, whereupon an MAG/DAG free fish oil ethyl ester was obtained in an amount of 585 g. Fish oil ethyl ester 2 thus obtained was entirely free of MAG and DAG and had iron and chlorine concentrations of 0.05 ppm and 7 ppm, respectively.

A hundred grams of fish oil ethyl ester 2 was mixed with 0.1 g of glycerol monomyristate and the mixture was rendered uniform by thorough dissolving to prepare fish oil ethyl ester 3. On the other hand, 100 g of fish oil ethyl ester 2 was mixed with 0.1 g of glycerol monopalmitate (Tokyo Chemical Industry Co., Ltd.; product code: G0083) and the mixture was rendered uniform by thorough dissolving to prepare fish oil ethyl ester 4.

Fish oil ethyl ester 3 or 4 was used as a sample (feed composition for distillation) and subjected to a precision distillation process consisting of the following first and second precision distillation steps.

The first precision distillation step is one for removing fractions of up to C18 ethyl esters. A vacuum jacketed fractionating tube ($\phi$25 mm; Kiriyama Glass) was operated using 5 units of Sulzer Lab Packing EX (25 mm×50 mm; Sulzer Chemtech Ltd.) as an internal packing. Precision distillation was performed for a heating period of 4.0 hours, with the liquid temperature in the column bottom (bottom temperature) being set 185° C. or below, the overhead vapor temperature (overhead temperature) being set at 135° C. or below, and the pressure upstream of a vacuum pump (overhead pressure, or the degree of vacuum) being set at 30 Pa or below. In this first precision distillation step, fractions of up to C18 ethyl esters were removed as the initial distillate to obtain an EPA enriched residue that was free of the initial distillate.

In the subsequent second precision distillation step, the residue free of the initial distillate as obtained in the first precision distillation step was subjected to the following precision distillation. A vacuum jacketed fractionating tube ($\phi$25 mm; Kiriyama Glass) was operated using 5 units of Sulzer Lab Packing EX (25 mm×50 mm; Sulzer Chemtech Ltd.) as an internal packing. Precision distillation was performed for a heating period of 3.5 hours, with the liquid temperature in the column bottom (bottom temperature) being set at 195° C., the overhead vapor temperature (overhead temperature) being set at 150° C., and the pressure upstream of a vacuum pump (overhead pressure, or the degree of vacuum) being set at 30 Pa. In this second precision distillation step, fractions of C22 and higher ethyl esters were removed as a residue (distillation residue) to obtain a main distillate.

Eighty grams of fish oil ethyl ester 3 as a feed had EPA enriched in the first precision distillation step to give 26 g of a residue free of initial distillate. Twenty-five grams of the obtained residue free of initial distillate was then fed to the second precision distillation step where EPA was further enriched to give 11 g of a main distillate. The main distillate had EPA enriched and as Table 4 shows, the proportion of EPA in the makeup of fatty acids increased from 20.9% to 73.1%. On the other hand, isomers were found to have formed due to the heating in the distillation process and the main distillate fraction were found to contain trans-isomers of EPA ethyl ester in an amount of 0.8 area % (the sum of five trans-isomers; not indicated in Table 4; hereinafter the same).

What is more, the 3-MCPD concentration was 0.00 ppm in fish oil ethyl ester 3 as the feed and increased after distillation to 0.01 ppm in the main distillate.

A portion (77.8 g) of fish oil ethyl ester 4 as a feed had EPA enriched in the first precision distillation step to give 29.5 g of a residue free of initial distillate. A portion (26.4 g) of the obtained residue free of initial distillate was then fed to the second precision distillation step where EPA was further enriched to give 12.6 g of a main distillate. The main distillate had EPA enriched and as Table 4 shows, the proportion of EPA in the makeup of fatty acids increased from 20.9% to 77.4%. On the other hand, isomers were found to have formed due to the heating in the distillation process and the main distillate fraction were found to contain trans-isomers of EPA ethyl ester in an amount of 1.6 area %.

What is more, the 3-MCPD concentration in the main distillate was 0.00 ppm, indicating no increase from the value for fish oil ethyl ester 4 as the feed.

TABLE 4

| | Fish oil ethyl ester 3 | | Fish oil ethyl ester 4 | |
|---|---|---|---|---|
| | Feed | Main distillate fraction | Feed | Main distillate fraction |
| Yield | | 15.3% | | 18.1% |
| Percent EPA recovery | | 53.6% | | 67.1% |
| C14:0 | 7.5 | 0.0 | 7.5 | 0.0 |
| C15:0 | 0.4 | 0.0 | 0.4 | 0.0 |
| C16:0 | 16.5 | 0.1 | 16.5 | 0.0 |
| C17:0 | 0.4 | 0.0 | 0.4 | 0.0 |
| C18:0 | 3.3 | 2.6 | 3.3 | 0.3 |
| C20:0 | 0.2 | 0.4 | 0.2 | 0.7 |
| C20:3 n-6 | 0.2 | 0.5 | 0.2 | 0.7 |
| C20:5 n-3 | 20.9 | 73.1 | 20.9 | 77.4 |
| C22:5 n-3 | 2.3 | 0.2 | 2.3 | 0.3 |
| C22:6 n-3 | 7.3 | 1.1 | 7.3 | 1.9 |
| Other fatty acids | 41.1 | 21.9 | 41.1 | 18.8 |
| 3-MCPD [PPM] | 0.00 | 0.01 | 0.00 | 0.00 |

Also investigated was the distribution of 3-MCPD in each of the fractions of fish oil ethyl esters 3 and 4. The material balance for 3-MCPD contained in each of the main distillate and the residue free of main distillate is shown in Table 5.

TABLE 5

| | Fish oil ethyl ester 3 | | Fish oil ethyl ester 4 | |
|---|---|---|---|---|
| | EPA | 3-MCPD | EPA | 3-MCPD |
| Main distillate | 75.3 | 28.0 | 80.3 | 0.0 |
| Residue free of main distillate | 24.7 | 72.0 | 19.7 | 100.0 |

It was revealed that the 3-MCPD concentration in the main distillate would be strongly affected by a particular MAG in the feed. Consider the main distillate that specifically comprised a fraction of EPA, or a C20 fatty acid component; in fish oil ethyl ester 3 where a MAG containing C14:0, or a C14 fatty acid, as a constituent fatty acid was added, the main distillate contained 28.0% of the whole 3-MCPD but in fish oil ethyl ester 4 where a MAG containing C16:0, or a C16 fatty acid, as a constituent fatty acid was added, all the 3-MCPD was contained in the residue free of the main distillate. This showed the following: in the case where C20 fatty acid ethyl esters including EPA ethyl ester are to be recovered as a main distillate, fatty acid esters of 3-MCPD formed from MAGs containing C14 fatty acids as constituent fatty acids will become included in the main distillate whereas fatty acid esters of 3-MCPD formed from MAGs containing C16 fatty acids as constituent fatty acids will hardly become included in the main distillate. Thus, it may well be concluded that when the highly unsaturated fatty acids to be refined are C20-PUFAs such as EPA, the 3-MCPD concentration in the distillation product is strongly affected by the C14 saturated fatty acid.

It should be noted here that in each of the tests conducted, the initial distillate was entirely free of 3-MCPD or its fatty acid esters.

INDUSTRIAL APPLICABILITY

According to the present invention, compositions comprising high concentrations of PUFA alkyl esters while containing fatty acid esters of 3-MCPD at low concentrations can be produced in a consistent manner.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A composition that contains fatty acids or fatty acid alkyl esters as its major component, the composition containing highly unsaturated fatty acid or alkyl ester thereof, wherein the proportion of the highly unsaturated fatty acid in the constituent fatty acids of the composition is 50 area % or more and wherein the concentration of 3-MCPD as found upon analyzing the composition by American Oil Chemists' Society official method Cd 29b-13 assay A is 0.01 ppm or more and less than 1.80 ppm.

2. The composition according to claim 1, wherein the proportion of the highly unsaturated fatty acid in the constituent fatty acids of the composition is 70 area % or more.

3. The composition according to claim 1, wherein the highly unsaturated fatty acid is eicosapentaenoic acid, docosahexaenoic acid, dihomo-γ-linolenic acid, arachidonic acid, or a combination thereof.

4. The composition according to claim 1, which is a distillation product.

5. The composition according to claim 1, wherein the composition is derived from a raw material selected from a fish oil, a microorganism oil, a vegetable oil or a marine animal oil.

* * * * *